United States Patent
Yoshida

Patent Number: 6,104,509
Date of Patent: *Aug. 15, 2000

[54] METHOD FOR CORRECTING QUANTITY OF EMITTED LIGHT

[75] Inventor: Futoshi Yoshida, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/955,108

[22] Filed: Oct. 21, 1997

[30] Foreign Application Priority Data

Oct. 21, 1996 [JP] Japan ................................... 8-277740

[51] Int. Cl.⁷ ..................................................... H04N 1/04

[52] U.S. Cl. ............................. 358/509; 355/35; 355/67; 347/130; 358/296; 362/800

[58] Field of Search ..................................... 358/475, 509, 358/296; 355/35, 37, 69, 67; 362/800; 395/109, 112; 347/130, 232

[56] References Cited

U.S. PATENT DOCUMENTS

| | | | |
|---|---|---|---|
| 5,296,944 | 3/1994 | Suzuki et al. | 358/475 |
| 5,515,136 | 5/1996 | Nishio et al. | 355/37 |
| 5,663,782 | 9/1997 | Saita et al. | 355/37 |
| 5,748,283 | 5/1998 | Sunagawa et al. | 355/37 |

*Primary Examiner*—Cheukfan Lee
*Attorney, Agent, or Firm*—Sughrue, Mion, Zinn, Macpeak & Seas, PLLC

[57] ABSTRACT

When an image is scanned and recorded on a photosensitive material, the quantity of emitted light of each of light emitting elements is corrected by controlling, based on digital image data, quantities of light beams emitted from light emitting portions of three colors, which each consist of a plurality of light emitting elements. A drive signal level of each of the light emitting elements is corrected for the same digital image data so that the light emitting elements which emit light beams of the same color have the same quantities of emitted light. Subsequently, the drive signal level of each of the light emitting elements is corrected for predetermined digital image data so that the ratio of the quantity of emitted light between the light emitting elements, which emit light beams of different colors, is set at a predetermined value.

10 Claims, 9 Drawing Sheets

METHOD FOR CORRECTING QUANTITY OF EMITTED LIGHT

BACKGROUND OF THE INVENTION

1. Field of the Invention

The present invention relates to a method for correcting a quantity of light emitted from light emitting elements in a case in which quantities of light beams emitted from light emitting portions of three colors are controlled based on digital image data and an image is scanned and recorded on a photosensitive material, a plurality of light emitting elements being provided for at least one of the light emitting portions of three colors.

2. Description of the Related Art

A number of image recording apparatuses each having a digital exposure system mounted thereon has been nowadays developed. Generally, in the digital exposure system, an image is recorded on a recording medium in such a manner that a light beam outputted from a semiconductor laser is modulated with image data and the light beam is deflected by high-speed rotation of a polygon mirror (main scanning), and further the light beam reflected by the polygon mirror is subjected to sub-scanning with a galvano mirror or the like, or the above main scanning is effected repeatedly while moving the recording medium (or moving the recording medium stepwise). Here, as the recording medium, a photosensitive drum electrified by corona discharge, a plane photosensitive material, or the like may be used. Further, in place of the semiconductor laser, other light emitter such as an LED may be used as a light source.

On the other hand, there exists an image recording apparatus in which, after an image has been recorded on a photosensitive material, the image is transferred to an image receiving material by heat development-transfer processing with the photosensitive material and the image receiving material overlapping each other. This apparatus includes a so-called analog exposure system (in this case, slit exposure is generally used in which light is irradiated on an original material and the light reflected therefrom is sequentially guided to the photosensitive material) and a digital exposure system, which are used to record the image on the photosensitive material.

Further, the above image recording apparatus allows the image to be recorded on an image receiving material having substantially the same quality as that of general paper and can select the analog exposure system or the digital exposure system as described above. For this reason, this image recording apparatus is suitably applied to various fields.

Moreover, there is proposed that a plurality of light emitting diodes is provided as light sources for each color and a plurality of lines is recorded simultaneously at one main scanning operation.

On the other hand, in the case of digital exposure, the quantity of light which reaches the photosensitive material is controlled based on image data at the point in time when light is irradiated from a light source or on an optical path. However, due to deterioration of the light source itself, variation of a power source for the light source, dirt of an optical system, or the like, an error may occur between the quantity of light which actually reaches the photosensitive material and the quantity of light obtained by calculation from the image data.

In order to solve the above-described drawback, correction of the quantity of light is effected as occasion demands in such a manner that a photoelectric converting element such as a photo-sensor is provided in a region with no image recorded thereon in the vicinity of the photosensitive material, a quantity of light on the surface of the photosensitive material is detected periodically (for each main scanning, for each image, or for each group of a plurality of images), and the detected value and the calculated value are compared with each other.

Here, a conventional method for correcting quantity of light is provided on condition that images are recorded for each line at the time of main scanning by a conventional image recording apparatus, and therefore, it suffices that only balance between colors be adjusted. Further, since a plurality of light sources is used to increase the quantity of light for one line, the balance of the quantity of light between the light emitting elements of the same color was out of the question.

SUMMARY OF THE INVENTION

However, when a plurality of lines is recorded simultaneously, a plurality of light emitting elements needs to be used for the same color. For this reason, the variation in the quantity of light between the light emitting elements of the same color has a great influence upon a finished image, for example, density unevenness.

In view of the above-described circumstances, it is an object of the present invention to provide a method for correcting a quantity of emitted light, in which a finished image can be improved by independently correcting the quantity of light of each of a plurality of light emitting elements and by preventing dispersion of quantities of light between light emitting portions of three colors and between light emitting elements which emit light beams of the same color.

A first aspect of the present invention is a method for correcting a quantity of light emitted from a light emitting element, in a case in which an image is scanned and recorded on a photosensitive material by controlling, based on digital image data, quantities of light beams emitted from light emitting portions which allows emission of light beams of three colors, light beams of at least one color being emitted from a plurality of light emitting elements, the method comprising the steps of: correcting a drive signal level of each of the light emitting elements for the same digital image data so that light emitting elements, which emit light beams of the same color, of a light emitting portion including a plurality of light emitting elements, have the same quantities of emitted light; and subsequently, correcting the drive signal level of each of the light emitting elements for predetermined digital image data so that the ratio of the quantity of emitted light between the light emitting elements which emit light beams of different colors is set at a predetermined value.

In accordance with the first aspect of the present invention, first, the drive signal level is corrected for the same digital image data so that the light emitting elements of the same color have the same quantities of emitted light.

Next, the drive signal level of each light emitting element is corrected by using, for example, predetermined digital image data such as a fixed signal so that the ratio of the quantity of emitted light between the light emitting elements having the different colors becomes a predetermined value.

The quantity-of-light correction value thus obtained is used to accurately correct the quantity of light between the light emitting elements in actual digital image data.

A second aspect of the present invention is constructed such that a drive signal level is detected by changing a drive signal level for each of the light emitting elements to obtain a predetermined quantity of emitted light and an amount of correction is determined based on the detected result.

Even when the quantities of light coincide with one another at a predetermined level, so long as respective rates of change of the quantities of light is different from one another, dispersion of the quantities of light slightly occurs. Particularly, in a case of the image in which a specified one color is highlighted, great differences in the quantity of light is made between the light sources of colors and an error increases correspondingly. For this reason, at the time of correction of the quantity of light, image data in which a level of the quantity of light changes at a predetermined rate of change is outputted and the quantity of light is corrected not only at an absolute value, but also at the rate of change. As a result, a finished image can be improved still further.

A third aspect of the present invention is constructed such that correction of the drive signal level is effected based on a table which indicates the relationship between the drive signal level varied for each of the light emitting elements and the quantity of emitted light.

As described above, the relationship between the drive signal level and the quantity of emitted light with the drive signal level being previously varied is indicated by the correction table, and therefore, the time for the correcting operation can be reduced.

A fourth aspect of the present invention is constructed such that an amount of correction is determined in such a manner that the light emitting elements are sequentially turned on and the quantity of emitted light of each of the light emitting elements is detected.

Although it suffices that a combined quantity of light is detected for the same main scanning line, when the quantity of light along the sub-scan direction is also detected, it is necessary to independently detect each quantity of light to prevent occurrence of density unevenness. Accordingly, a correction value is determined in such a manner that a plurality of light emitting elements is turned on sequentially and independently and each quantity of emitted light therefrom is detected.

A fifth aspect of the present invention is constructed such that the table is prepared in such a manner that the light emitting elements are sequentially turned on and the quantity of light emitted from each of the light emitting elements is detected.

In order to eliminate an error which is caused by a deterioration of the light emitting elements with the passage of time, it is necessary to periodically update the correction table. In this case, it suffices that the light emitting elements are sequentially turned on, the quantity of light of each light emitting element is detected, and based on the detected data, the correction table is prepared.

As described above, the method for correcting the quantity of emitted light according to the present invention has an excellent effect in that a finished image can be improved by independently correcting the quantity of light of each of a plurality of light emitting elements and by preventing dispersion of the quantities of light between the light emitting portions of the three colors and between the light emitting elements which emit light beams of the same color.

DESCRIPTION OF THE PREFERRED EMBODIMENTS

Figure 1:
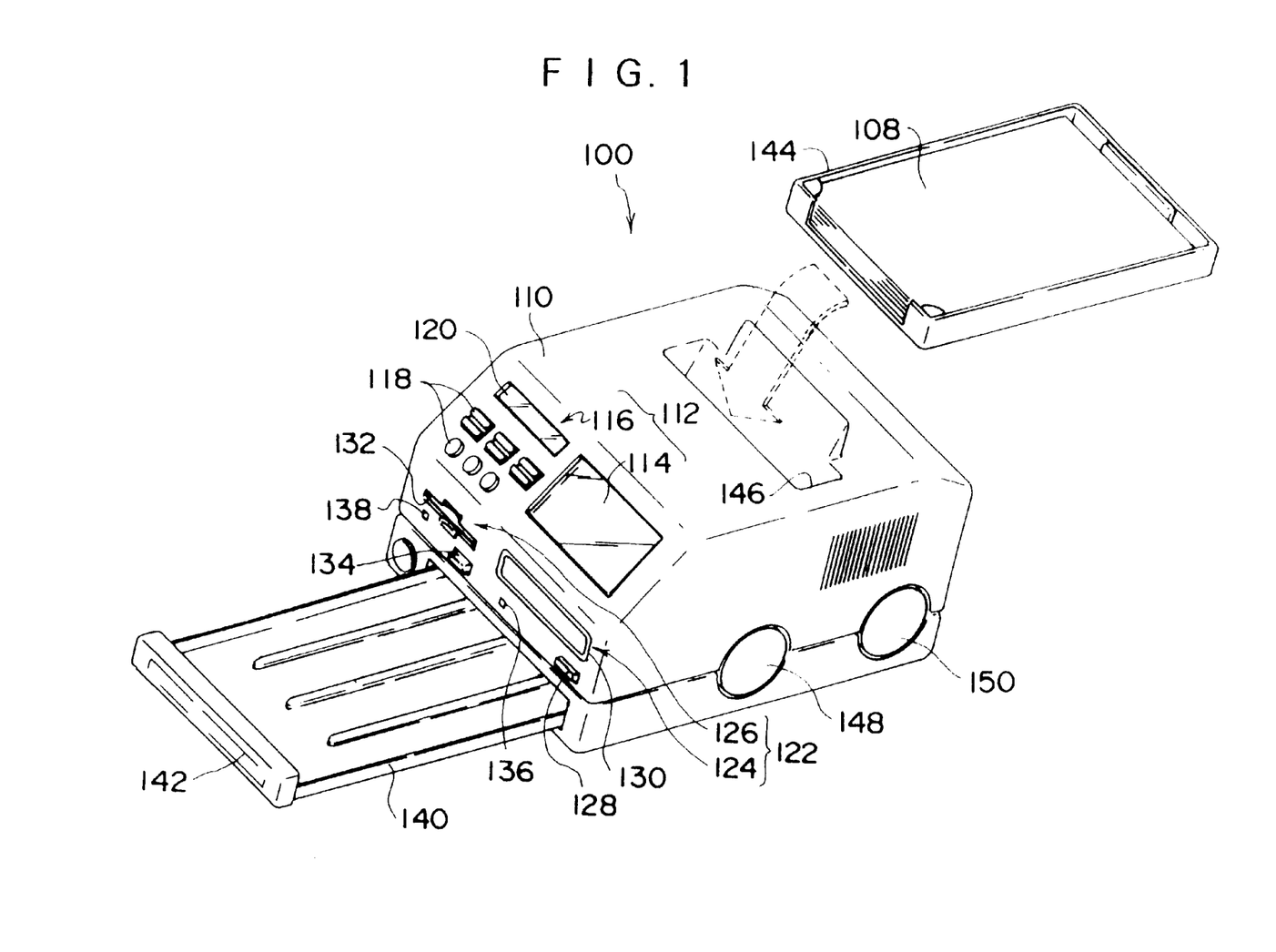
FIG. 1 is a perspective view of an image recording apparatus according to an embodiment of the present invention.
Figure 2:
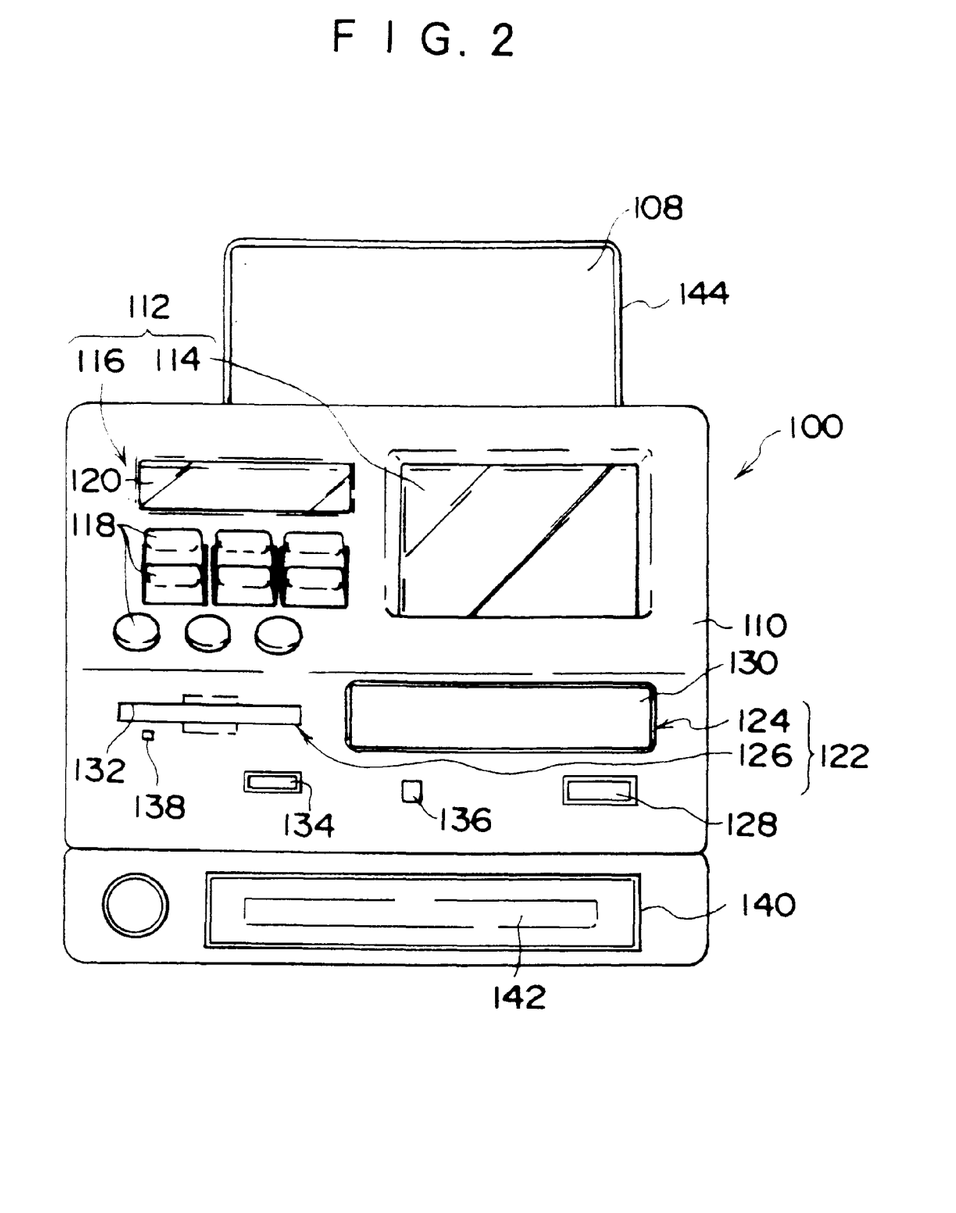
FIG. 2 is a front view of the image recording apparatus according to the embodiment of the present invention.
Figure 3:
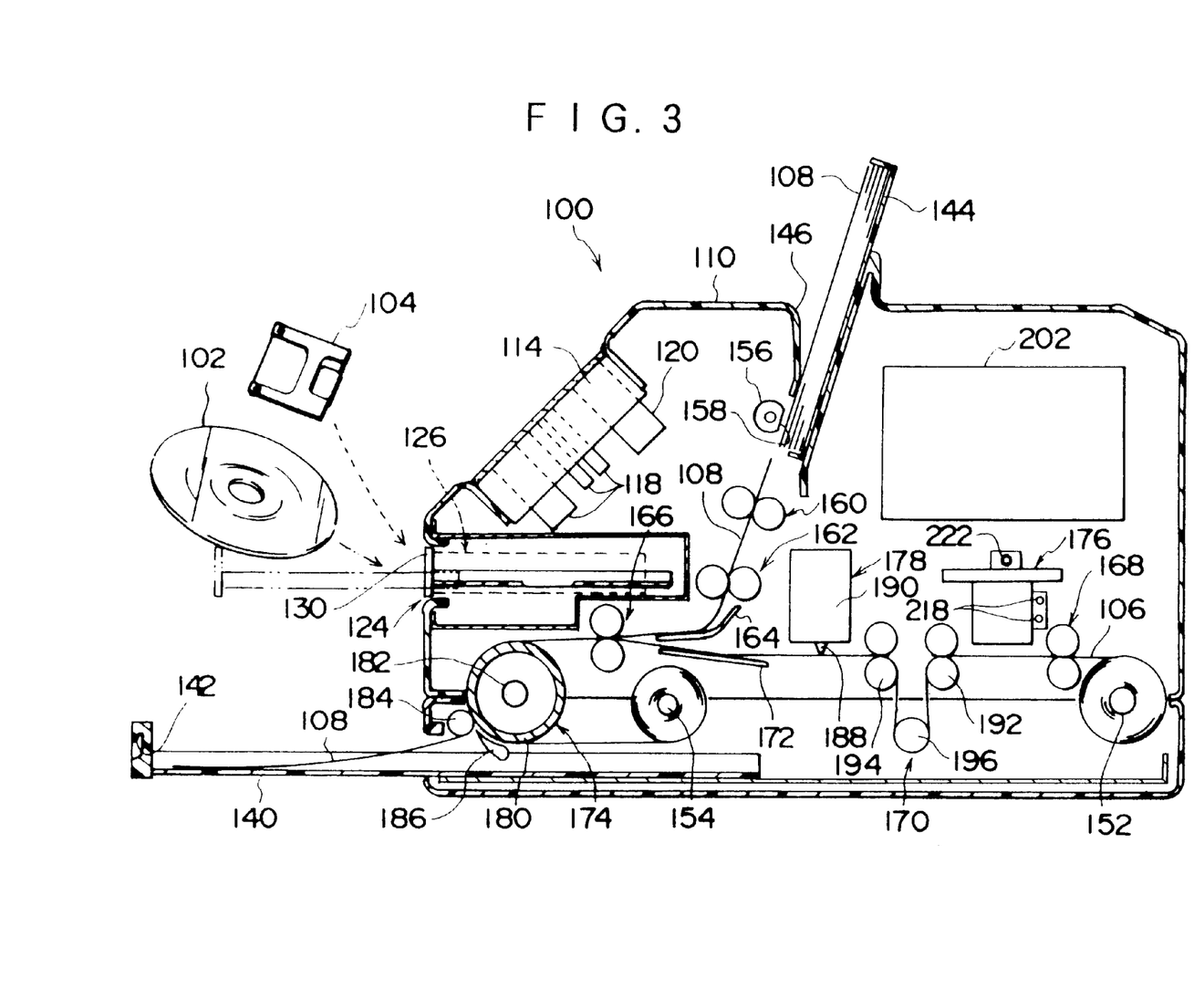
FIG. 3 is a cross-sectional side view showing an internal structure of the image recording apparatus according to the embodiment of the present invention.

First Embodiment
Overall Structure (Exterior View):

Referring now to FIGS. 1 through 3, an image recording apparatus 100 according to a first embodiment of the present invention is shown therein.

The image recording apparatus 100 reads image data recorded on an optical disk 102 or an FD 104 (which are both shown in FIG. 3) to expose onto a photosensitive material 106, and transfers an image recorded on the photosensitive material 106 to an image receiving paper 108 and outputs the image receiving paper 108.

An upper portion of the front surface of a box-shaped casing 110 (at the left side on the paper of FIG. 3) is formed as an inclined surface and an operation indicating portion 112 is provided thereon.

As shown in FIG. 2, the operation indicating portion 112 is divided into a monitor portion 114 and an input portion 116 which are disposed at right and left sides, respectively. The monitor portion 114 allows the read image to be projected thereon.

Further, the input portion 116 is formed by a plurality of operation keys 118 and a display portion 120 for confirmation of input data and allows input of data which is required for image recording, for example, the number of sheets to be recorded, size setting, color-balance adjustment, negative/positive selection, and the like.

A deck portion 122 is provided below the operation indicating portion 112. The deck portion 122 is formed by an optical-disk deck portion 124 and an FD deck portion 126 which are disposed at right and left sides, respectively, on the paper of FIG. 2.

The optical-disk deck portion 124 is provided in such a manner that a tray 130 can be opened and closed by pressing an open/close button 128. An optical disk 102 can be loaded in an interior of the apparatus in such a manner as to be placed on the tray 130.

An FD insertion slot 132 is provided in the FD deck portion 126. When the FD 104 is inserted in the FD insertion slot 132, a drive system within the apparatus is actuated to insert the FD 104 into the apparatus. Further, in order to take out the FD 104 from the FD deck portion 126, an operation button 134 is pressed to pull out the FD 104.

Further, access lamps 136, 138 are respectively provided for the optical-disk deck portion 124 and the FD deck portion 126 and are each provided to be turned on during access within the apparatus.

A discharge tray 140 is provided further below the deck portion 122. The discharge tray 140 is usually accommodated within the apparatus and is provided to be pulled out by an operator's finger being put on a holding portion 142 (see FIG. 1).

The image receiving paper 108 on which the image is recorded is discharged onto the discharge tray 140.

The image receiving paper 108 is previously accommodated on a tray 144 in a layered form. The tray 144 is mounted in a tray mounting hole 146 formed on an upper surface of the casing 110. The image receiving papers 108 are taken out one by one from the tray 144 mounted in the tray mounting hole 146, and after images are transferred onto the image receiving papers 108, these image receiving papers 108 are guided to the discharge tray 140.

Two circular cover members 148, 150 are attached to the right side surface of the casing 110 (toward the front side on the paper of FIG. 1). These cover members 148, 150 are each provided to be independently removable. As shown in FIG. 3, a take-up reel 154 and a feed reel 152 onto which the rolled photosensitive material 106 is wound are disposed within the apparatus along axial directions of the cover members 148, 150, respectively. These reels 152, 154 can be taken out from or loaded into the apparatus in a state in which the covers 148, 150 are removed.

Image Receiving Paper Conveying System:

As shown in FIG. 3, the tray 144 loaded in the tray mounting hole 146 is provided such that an upper surface of the leading end of the tray (at the side where the tray 144 is inserted into the tray mounting hole 146) faces a semicircular roller 156.

The semicircular roller 156 is formed in such a state that a cylindrical roller is cut along a plane parallel to an axis thereof. Usually, a cutting surface 158 of the semicircular roller 156 faces an uppermost image receiving paper 108 within the tray 144 with a space formed therebetween. When the semicircular roller 156 rotates, the image receiving paper 108 of the uppermost layer and the peripheral surface of the semicircular roller 156 contact each other, and the image receiving paper 108 is pulled out by a small amount when the semicircular roller 156 makes one rotation. The pulled-out image receiving paper 108 is nipped between a first roller pair 160 and is completely pulled out from the tray 144 by driving force of the first roller pair 160.

A second roller pair 162, a guide plate 164, and a third roller pair 166 are sequentially disposed at the downstream side of the first roller pair 160. The image receiving paper 108 is, after having been nipped by the first roller pair 160, nipped by the second roller pair 162, guided by the guide plate 164, and further nipped by the third roller pair 166.

The image receiving paper 108 overlaps with the photosensitive material 106 at the third roller pair 166. Namely, the third roller pair 166 is also used as a conveying path of the photosensitive material 106.

Photosensitive Material Conveying System:

The photosensitive material 106 is accommodated in the apparatus in a state of being elongated and wound onto the feed reel 152 in a layered form. The feed reel 152 is mounted at a predetermined position in such a manner that the cover member 150 (at the rear side of the apparatus) is removed and the feed reel 152 is inserted into the apparatus in the axial direction thereof.

With the photosensitive material 106 being mounted at the predetermined position, loading of the photosensitive material 106 is effected along a predetermined conveying path with an outermost layer of the photosensitive material 106 being set as initialization. The photosensitive material 106 is loaded in such a procedure that the outermost layer thereof is pulled out from the feed reel 152, nipped by a fourth roller pair 168 in the vicinity of the feed reel 152, conveyed through a reservoir portion 170 and a guide plate 172, and is nipped by the third roller pair 166, and thereafter, the outermost layer is sequentially entrained onto a heat roller 174 and a take-up reel 154. In this case, a leader tape having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the image has been exposed onto the photosensitive material 106 in the exposure section 176, the photosensitive material 106 is provided to overlap with the image receiving material 108 at the third roller pair 166 in a state in which water is applied to an emulsion surface (i.e., a surface to be exposed) of the photosensitive material.

Heat Roller:

The heat roller 174 serves as a heat development-transfer section of the apparatus and is formed by a cylindrical roller main body 180 and a heater 182 provided within the roller main body 180 along the axial direction of the roller main body. The heat roller 174 serves to apply heat to members wound onto the roller main body 180 (i.e., the photosensitive material 106 and the image receiving material 108) in such a manner that the surface of the roller main body 180 is heated by actuation of the heater 182. The heating of the heat roller 174 allows heat development-transfer processing and the image recorded on the photosensitive material 106 is thereby transferred onto the image receiving paper 108.

A peeling roller 184 and a peeling claw 186 are disposed in the vicinity of a lower right side of the heat roller 174 and are provided to separate, from the photosensitive material 106, the image receiving paper 108 wound onto the heat roller 174 by a length of about one third the overall circumference of the heat roller 174 to guide the image receiving paper 108 toward the discharge tray 140.

On the other hand, the photosensitive material 106 is wound onto the heat roller 174 by a length of about a half the overall circumference of the heat roller and is turned to an opposite direction to be guided to a position where the take-up reel 154 is mounted.

Water Applying Portion:

As shown in FIG. 3, the water applying portion 178 operates to apply water, serving as an image forming solvent, onto the photosensitive material 106 or the image receiving paper 108 to allow overlapping surfaces of the photosensitive material 106 and the image receiving paper 108 to closely adhere to each other for heat development. The water applying portion 178 is formed by an applying member 188 extending along a transverse direction of the photosensitive material 106 and a tank 190 in which water is filled.

The applying member 188 is formed of a high water-absorptive material, for example, felt, sponge, or the like, having a proper degree of hardness and is provided to contact the photosensitive material 106 at a predetermined pressure during conveying of the photosensitive material 106. Water filled in the tank 190 is constantly supplied to the applying member 188 by a proper amount by taking advantage of capillary phenomenon. When the photosensitive material 106 and the applying member 188 contact each other, water is applied onto the surface. (i.e., the emulsion surface) of the photosensitive material 106 by the applying member 188.

Further, since the applying member 188 abuts against the photosensitive material 106 at a proper pressure, water is uniformly applied to the photosensitive material 106.

Replenishment of water into the tank 190 is effected in such a manner that the entire water applying portion 178 is removed from the apparatus, but water may be constantly supplied from an exterior of the apparatus by using a pipe arrangement.

Meanwhile, in the present embodiment, water is used as the image forming solvent, but the water used in this embodiment is not limited to pure water and also includes water which is widely and generally used. Further, a mixed solvent of water and a low-boiling-point solvent such as methanol, DMF, acetone, diisobutylketone, or the like may be used. Moreover, a solution which contains an image formation accelerator, an anti-fogging agent, a development stopping agent, hydrophilic heat solvent, or the like may also be used.

Figure 4:
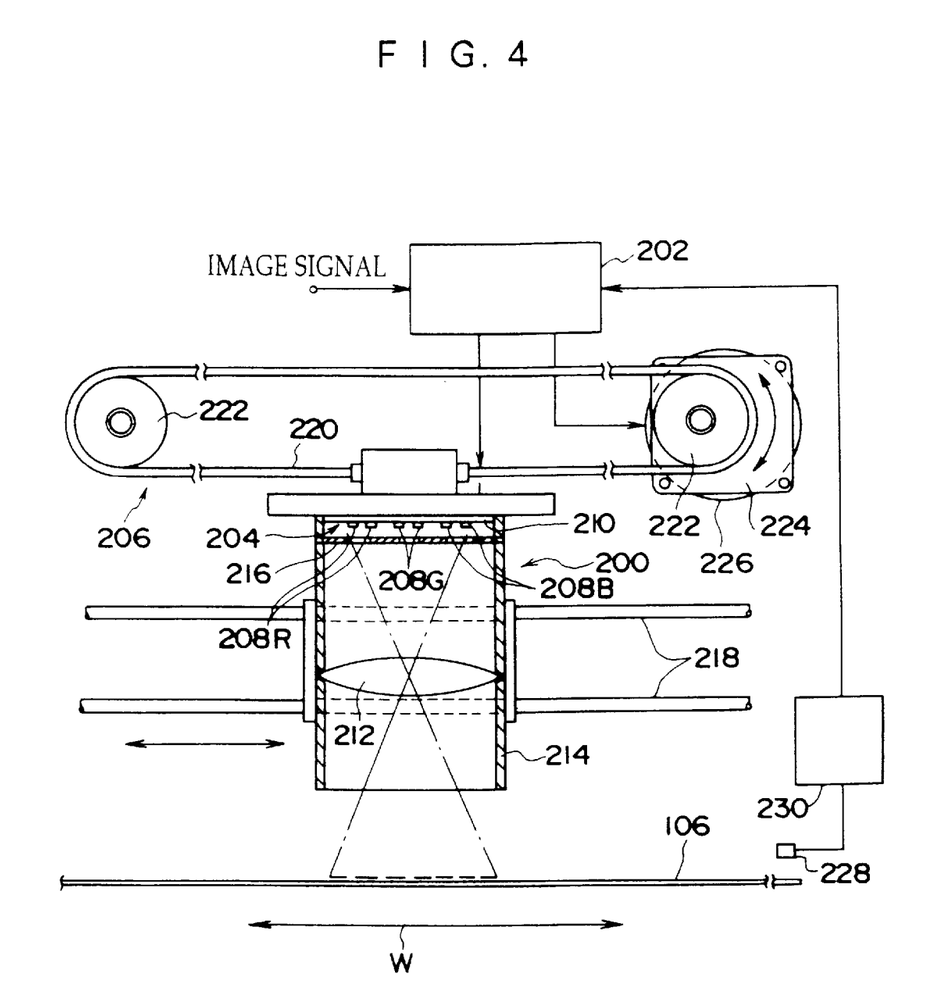
FIG. 4 is a front view showing a schematic structure of an exposure section.

Exposure Section:

FIG. 4 shows an exposure section 176 at the apparatus.

The exposure section 176 is mainly formed from a light source unit 200 provided above the conveying path of the photosensitive material 106 and is connected to a controller 202. The controller 202 has a memory in which an image signal (the image signal read from the optical disk 102 or FD 104) is stored and turns on a light source portion 204 within the light source unit 200 in accordance with the image signal. The light source unit 200 is provided to be movable in the transverse direction of the photosensitive material 106 (i.e., the main scanning direction) in such a manner as to be driven by a main scanning unit 206, which will be described later. The main scanning operation is effected when the photosensitive material 106 is step-driven and stops in the exposure section 176.

The light source unit 200 of the exposure section 176 is covered by a box-shaped exposure casing 214. The light source portion 204 is disposed on the upper end surface of the exposure casing 214 and a light emission surface of the light source portion 204 is directed toward an interior of the exposure casing 214. An aperture 216 is provided for each of colors on the side of the light emission surface of the light source portion 204 to limit scattering of light from a plurality of LED chips 208. Meanwhile, the structure having no aperture 216 may also be provided.

A telecentric lens 212 is provided on the lower side of the apertures 216 and at the central portion of the exposure casing 214 and serves to converge light from the light source portion 204 to form an image on the photosensitive material 106. Meanwhile, the resolution of an image thus formed is about 250 to 400 dpi.

The telecentric lens 212 is formed by a plurality of lenses and a diaphragm and has characteristics in which magnification thereof does not vary even when the height of an image surface changes. The telecentric lens 212 can eliminate vibration generated during the main scanning movement made by the main scanning unit 206, and an error caused by a state in which the exposure casing 214 is mounted.

Further, the focus of the telecentric lens 212 is constantly adjusted by an automatic focusing mechanism (not shown). Alternatively, the telecentric lens 212 may also be formed as a lens system whose depth of focus is large so as to eliminate the need of adjustment of the focus.

The light source unit 200 is supported by a pair of guide shafts 218 disposed parallel to each other and forming a part of the main scanning unit 206. These guide shafts 218 are provided along the transverse direction of the photosensitive material 106 (i.e., the direction indicated by arrow W in FIG. 4). The light source unit 200 is guided by the guide shafts 218 so as to be movable in the transverse direction of the photosensitive material 106.

A portion of an endless timing belt 220 is fixed at the exposure casing 214 of the light source portion 204. The timing belt 220 is entrained onto sprockets 222 positioned in the vicinities of both ends of the pair of guide shafts 218. The rotating shaft of one of the sprockets 222 is connected via a transmission 224 to the rotating shaft of a stepping motor 226. Due to reciprocating rotation of the stepping motor 226, the light source unit 200 is moved along the guide shafts 218 in a reciprocating manner.

The drive of the stepping motor 226 is controlled by the controller 202 and is synchronized with the step driving of the photosensitive material 106. Namely, in the state in which the photosensitive material 106 is moved by one step and stops, the stepping motor 226 starts rotating to move the light source portion 204 on the photosensitive material 106 along the transverse direction of the photosensitive material 106. When the stepping motor 226 is rotated in the reverse direction after a predetermined number of pulses has been confirmed, the light source portion 204 returns to its original position. Subsequent movement of the photosensitive material 106 starts synchronously with the returning motion of the light source portion 204.

A photodiode 228 is provided at the side where light is emitted from the light source portion 204 so as to face the photosensitive material 106 and outputs a signal corresponding to a quantity of light from the light source portion 204 in which light has been received. The photodiode 228 is connected to a light-quantity correction unit 230 and the signal corresponding to the quantity of light is inputted to the light-quantity correction unit 230.

The light-quantity correction unit 230 compares the quantity of light from the LED chips 208 of each of the detected colors with a quantity-of-light value predicted from a correcting fixed signal to adjust density and color balance, and further outputs a correction value to the controller 202. The image signal to be transmitted to the light source portion 204 is corrected based on the correction value and each LED chip 208 is turned on at a proper quantity of light.

Figure 5:
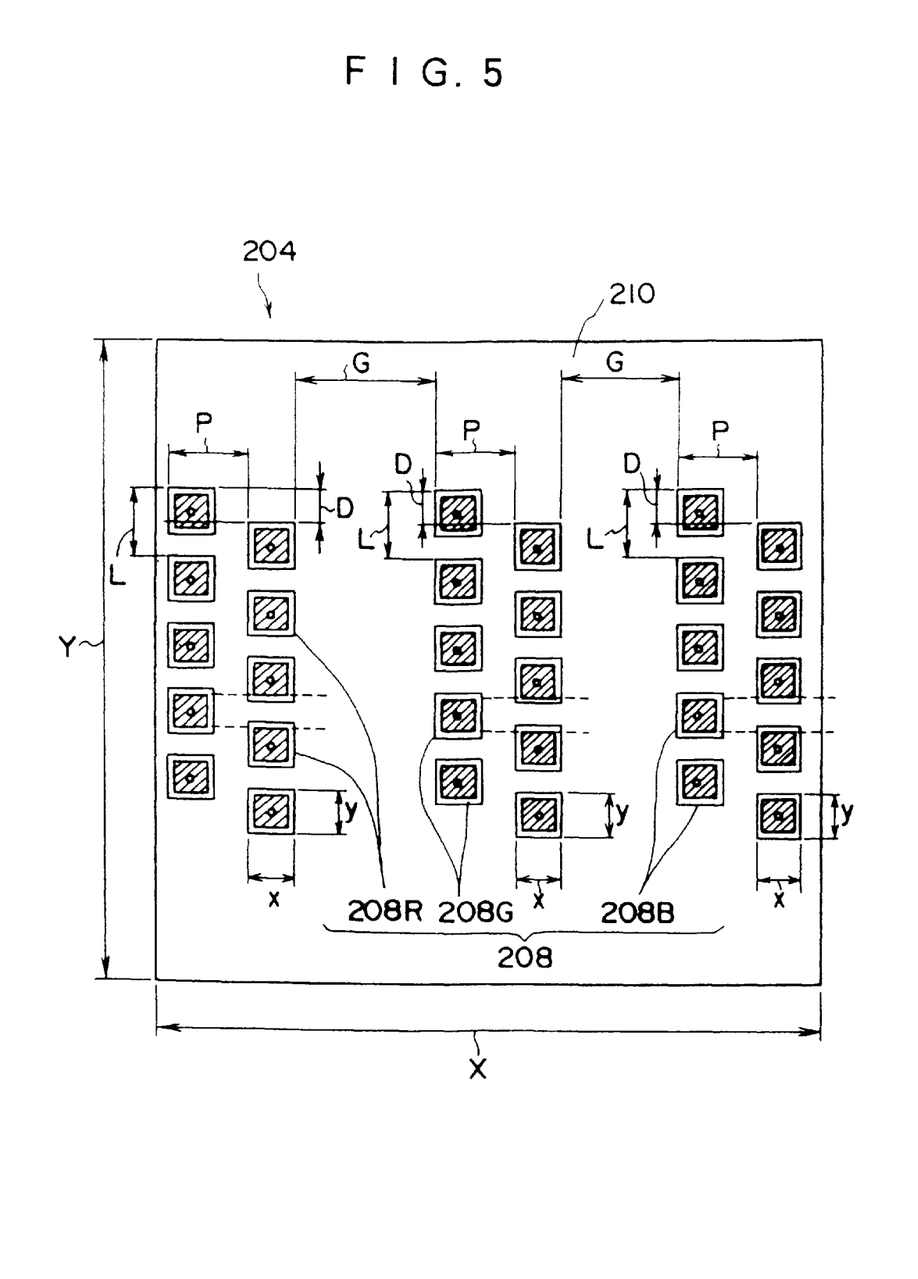
FIG. 5 is a plan view showing a light source portion of the exposure section.

As shown in FIG. 5, the light source portion 204 is formed with the plurality of LED chips 208 being arranged in groups. These LED chips 208 which emit light of colors of blue (B), green (G), and R (red) (when described below for each of the colors, the LED chip which emits light of blue is referred to as B-LED chip 208B, the LED chip which emits light of green is referred to as G-LED chip 208G, and the LED chip which emits light of red is referred to as R-LED chip 208R) are mounted onto a substrate 210 along the transverse direction of the photosensitive material 106 (i.e., the main scanning direction) for each of the colors in accordance with the same arrangement rule. Meanwhile, the wavelength of light from the-R-LED chip 208R is 650±20 nm, the wavelength of light from the G-LED chip 208G is 530±30 nm, and the wavelength of light from the B-LED chip 208G is 470±20 nm.

On the substrate 210 in the plan view shown in FIG. 5, ten B-LED chips 208B are arranged in two rows and in a zigzag manner at the right end, ten R-LED chips 208R are arranged in two rows and in a zigzag manner at the left end, and ten G-LED chips 208G are arranged in two rows and in a zigzag manner at the central position. Namely, the totaled six rows of LED chips 208 are arranged.

A predetermined wiring arrangement is provided on the substrate 210 by etching processing or the like and each wire is covered by metal for heat dissipation so as not to cause a short circuit between the wires. For this reason, generation of heat due to the LED chips 208 being turned on can be restricted and variation of an amount by which light is emitted can also be limited.

The dimensions of each of parts of the light source portion 204 applied to the present embodiment are as follows.

The horizontal and vertical dimensions (X×Y) of the substrate 210 are 5×5 mm (maximum) and the dimensions of each LED chip 208 (x×y) are about 360×360 $\mu$m. The row pitch P of the same color LED chips is 600 $\mu$m, the line pitch L of each row of the LED chips is 520 $\mu$m, and the distance D of a stepped portion formed in the zigzag arrangement along the vertical direction of the substrate is 260 $\mu$m. The distance G of a space between the adjacent groups of LED chips cannot be determined univocally, but is determined by the telecentric lens 212. Preferably, the respective distances G between the R-LED chips 208R and the G-LED chips 208G and between the G-LED chips 208G and the B-LED chips 208B are equal to each other.

The diagonal line section of each of the LED chips 208 shown in FIG. 5 is a region from which light is actually emitted. As shown in the diagonal lines shown in FIG. 5, borders of the light emission region in the adjacent rows of LED chips are provided to correspond to each other.

The light source portion 204 having above-described structure allows recording of ten main scanning lines by one main scanning operation for each of the colors. For this reason, step movement of the photosensitive material 106 is controlled such that the photosensitive material 106 is driven and stopped repeatedly at a pitch of ten times the width of a main scanning line recorded thereon.

Figure 6:
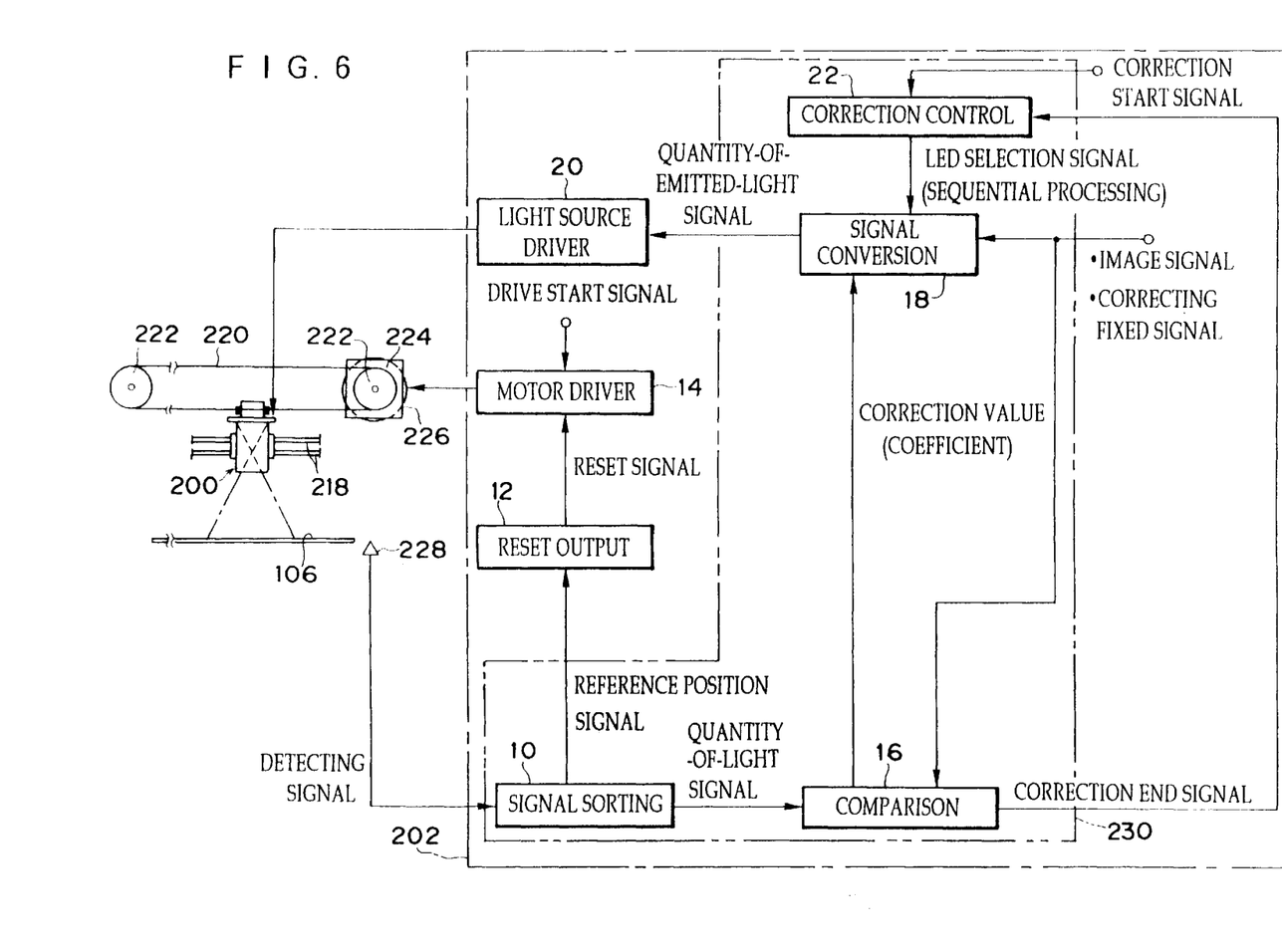
FIG. 6 is a control block diagram for image recording and correction of a quantity of light.

FIG. 6 shows the controller 202 and the quantity-of-light correction unit 230 in detail.

The photo-sensor 228 is connected to a signal sorting section 10 included in the quantity-of-light correction unit 230 within the controller 202. The signal sorting section 10 sorts a signal outputted from the photo-sensor 228 between a reference position signal which indicates a scan start position of the light source unit 200 and a quantity-of-light signal based on the quantity of light detected by the photo-sensor 228.

The reference position signal is supplied for a reset output section 12 and a reset signal which resets (for example, sets at zero) a pulse signal of the stepping motor 226 is outputted from the reset output section 12 to a motor driver 14.

In the motor driver 14, a drive start position is determined based on the reset signal and main scanning starts based on the drive start signal.

On the other hand, the quantity-of-light signals sorted by the signal sorting section 10 are supplied to a comparing section 16. A correcting fixed signal is previously inputted to the comparing section 16, in which the correcting fixed signal (i.e., a signal corresponding to a predetermined quantity of light by calculation) and the quantity-of-light signal (i.e., a signal corresponding to an actually detected quantity of light) are compared with each other.

The comparing section 16 is connected to a signal converting section 18 and a correction value (i.e., correction factor) based on the above compared result is supplied for the signal converting section 18.

The correcting fixed signal and image signal are inputted to the signal converting section 18. Usually, when the image signal is inputted, the signal converting section 18 serves to calculate the quantity of light of the LED chip 208 based on the image signal and transmit a quantity-of-emitted-light signal to the light-source driver 20. The light-source driver 20 receives the quantity-of-emitted-light signal to cause the LED chip 208 to emit light.

Here, at the time of correcting the quantity of light (i.e., when a previously set fixed period in time has elapsed), the correction start signal is supplied for a correction control section 22. During input of the correction start signal, the correcting fixed signal, not an ordinary image signal, is supplied for the signal converting section 18.

When the correction start signal is inputted to the correction control section 22, the correction control section 22 outputs, to the signal converting section 18, an LED selection signal for selecting the LED chip 208 in a predetermined order so as to test the LED chips 208 one by one. When the LED selection signal is inputted to the signal converting section 18, a signal which specifies the LED chip 208 together with the quantity-of-emitted-light signal (i.e., a signal corresponding to the correcting fixed signal) are outputted from the signal converting section 18 to the light-source driver 20 and only specified LED chip 208 is turned on.

For this reason, the photo-sensor 228 can detect the quantity of light of a single emitting LED chip 208, and based on the detected value, the quantity of light is corrected. Meanwhile, when a correction control operation for the final LED chip 208 is completed, a correction end signal is outputted to the correction control section 22 and the process returns to an ordinary image recording operation.

Reservoir Portion:

The reservoir portion 170 is, as described above, disposed between the exposure section 176 and the water applying portion 178 and is formed by two pairs of nip rollers 192, 194 and one dancer roller 196. The photosensitive material 106 is entrained between the two pairs of nip rollers 192, 194 and a substantially U-shaped slack portion is formed in the photosensitive material 106 between these pairs of nip rollers. The dancer roller 196 moves up and down correspondingly to the slack portion to hold the slack portion of the photosensitive material 106.

In the exposure section 176, the photosensitive material 106 is moved in a stepwise manner, but in the water applying portion 178, it is necessary that the photosensitive material 106 be conveyed at a fixed speed so as to allow uniform application of water onto the photosensitive material 106. For this reason, the difference in the conveying speed of the photosensitive material 106 is generated between the exposure section 176 and the water applying portion 178. In order to eliminate the difference in the conveying speed, the dancer roller 196 moves up and down to adjust an amount of slack formed in the photosensitive material 106 so that the stepwise movement and the constant-speed movement of the photosensitive material 106 can thereby be carried out synchronously.

Next, an operation of the present embodiment will be described.

An overall flow of an image recording operation will be first described.

In the state in which the tray 144 is loaded in the tray mounting hole 146 and the feed reel 152 onto which the photosensitive material 106 is completely taken up and the take-up reel 154 which is in an empty state are mounted at respective predetermined positions, when a printing start key of the operation indication portion 112 is operated, the controller 202 reads and stores image data from the optical disk 102 or the FD 104.

When the image data is stored in the controller 202, the feed reel 152 is driven to start conveying the photosensitive material 106.

When the photosensitive material 106 reaches a predetermined position in the exposure section 176, the photosensitive material 106 is stopped temporarily and image signals of ten lines are outputted from the controller 202 to the light source portion 204. The image signals are outputted every ten lines and the light source portion 204 is guided by the guide shaft 218 by drive of the stepping motor 226 to move along the transverse direction of the photosensitive material 106 (main scanning). Prior to the outputting of the image signal, the quantity of light for each of the colors from the light source portion 204 is detected by the photodiode 228, and in the light-quantity correction unit 230, a correction value for adjustment of density, color balance, and the like is supplied for the controller 202, to thereby correct the image signal. The correction of the image signal is made for each image.

When first main scanning is completed, the photosensitive material 106 is moved by one step (10-line pitch) and stops, and subsequently, second main scanning is effected. By repeating the above main scanning, an image of one frame is recorded on the photosensitive material 106. The photosensitive material 106 on which the image has been recorded is held by drive of only upstream side nip roller pair 192 in the reservoir portion 170 (a downstream side nip roller pair 194 is stopped) in the state of having a slack portion in the reservoir portion 170 to be entrained onto the dancer roller 196. For this reason, the above photosensitive material 106 is not provided to reach the water applying portion 178.

When the photosensitive material 106 having a length of one image is accumulated in the reservoir portion 170, the nip roller pair 194 at the downstream side of the reservoir portion 170 starts driving. As a result, the photosensitive material 106 (recording of images thereon has been completed) is conveyed to the water applying portion 178. In the water applying portion 178, the photosensitive material 106 is conveyed at a constant speed and water is uniformly applied to the photosensitive material by the applying member 188.

Water is constantly conveyed from the tank 190 to the applying member 188 and the photosensitive material 106 is pressed by the applying member 188 at a predetermined pressure. For this reason, a proper amount of water is applied to the photosensitive material 106.

The photosensitive material 106 to which water is applied is guided by the guide plate 172 and is conveyed to the third roller pair 166.

On the other hand, the peripheral surface of the semicircular roller 156 and the leading end of the image receiving paper 108 contact each other due to one rotation of the semicircular roller 156, and the image receiving paper 108 of the uppermost layer is pulled out and is nipped by the first roller pair 160. The image receiving paper 108 is pulled out from the tray 144 by being driven by the first roller pair 160 and waits for arrival of the photosensitive material 106 in the state of being nipped by the second roller pair 162.

Synchronously with the passing of the photosensitive material 106 through the guide plate, the first roller pair 160 and the second roller pair 162 start driving and the image receiving paper 108 is guided by the guide plate 164 and conveyed to the third roller pair 166.

The photosensitive material 106 and the image receiving paper 108 are nipped by the third roller pair 166 in an overlapping state and are conveyed to the heat roller 174. At this time, the photosensitive material 106 and the image receiving paper 108 closely adhere to each other by water applied to the photosensitive material 106.

The photosensitive material 106 and the image receiving paper 108 in the overlapping manner are entrained onto the heat roller 174 and is subjected to heat from the heater 182 for heat development-transfer processing. In other words, the image recorded on the photosensitive material 106 is transferred onto the image receiving paper 108 so as to form an image on the image receiving paper 108.

The heat development-transfer processing is completed in the state in which the image receiving paper 108 is wound onto the heat roller 174 by a length of about one third the entire circumference of the roller, and subsequently, the image receiving paper 108 is separated from the photosensitive material 106 by the peeling roller 184 and the peeling claw 186, and is discharged onto the discharge tray 140 in the state of being wound onto the peeling roller 184.

On the other hand, the photosensitive material 106 is wound onto the heat roller 174 by a length of about a half the overall circumference of the roller, and thereafter, the photosensitive material 106 moves in the tangential direction and is wound onto the take-up reel 154.

Figure 7:
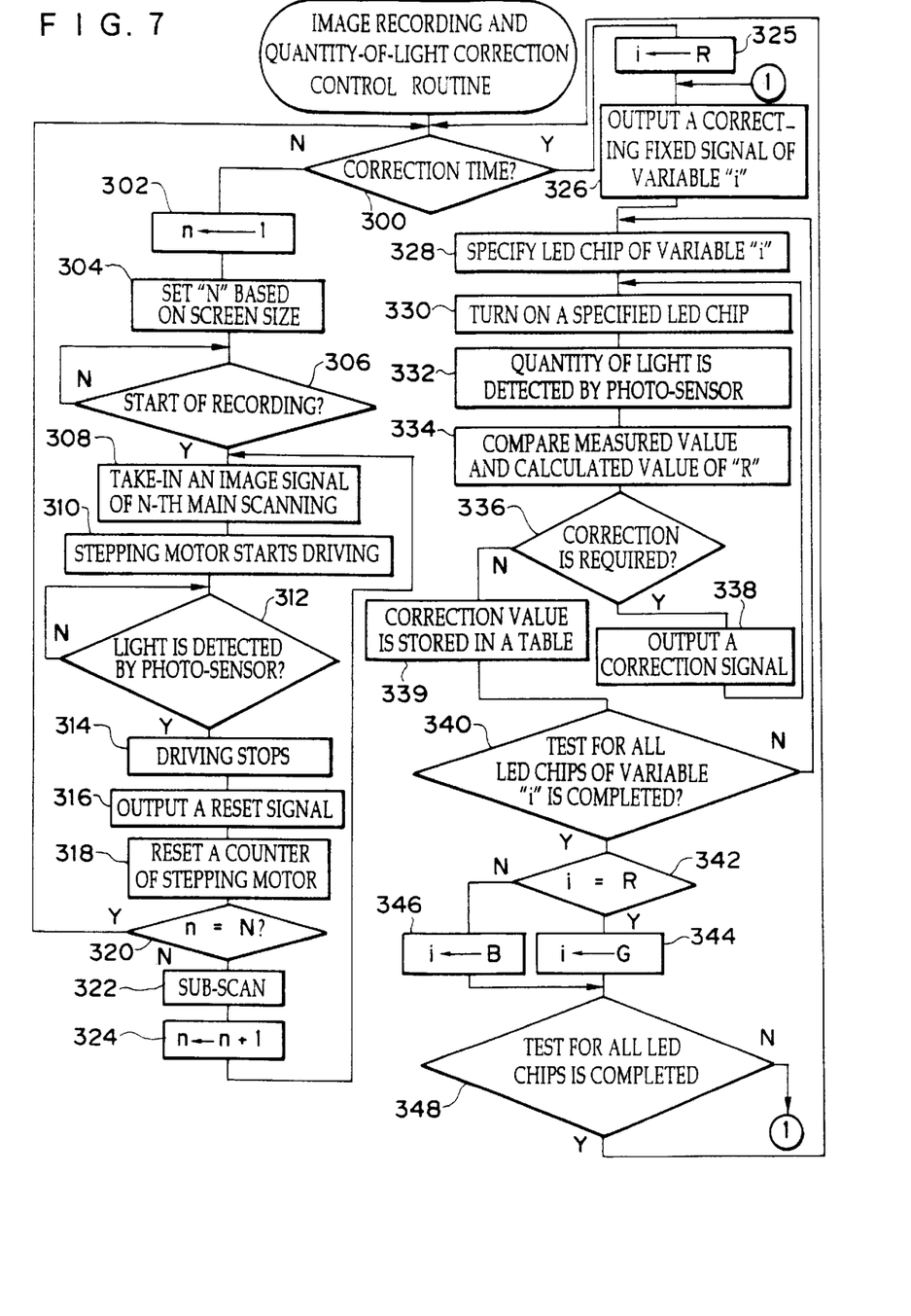
FIG. 7 is a control flow chart for image recording and correction of a quantity of light.

Next, an image recording and quantity-of-light correction control routine will be described in detail with reference to the flow chart shown in FIG. 7. In the quantity-of-light correction control operation, a correction table is prepared which corrects the quantity of light such that the quantities of light of light emitting diodes becomes equal for each of the three colors, R, G, and B and the ratio of the quantity of light between the three colors of R, G, and B is set so as to have a predetermined ratio, for example, R:G:B=5:2:3.

In step 300, it is determined whether it is the correction time or not. When the decision of step 300 is no, an ordinary image recording mode is carried out, and the process proceeds to step 302. In step 302, variable "n" is set at 1. In the subsequent step 304, the number of main scanning "N" is set based on a frame size of an image to be recorded, and the process proceeds to step 306.

In the subsequent step 306, it is determined whether it is the recording start time or not. When the decision of step 306 is yes, the process proceeds to step 308, in which an image signal required for a n-th main scanning operation is taken in and is corrected by using a correction table (described later).

Step 310 starts driving the stepping motor 226 and effects a main scanning operation based on a quantity-of-light signal which is obtained from the corrected image signal. At this time, the amount by which the light source unit 200 moves is automatically set based on the frame size.

Each time the light source unit 200 moves and returns to its original position, the light source unit 200 is detected by the photo-sensor 228. Namely, when light is detected by the photo-sensor 228 (when the decision of step 312 is yes), it is determined that one main scanning has been completed, and the process proceeds to step 314, in which the stepping motor 226 stops driving. The subsequent step 316 allows output of a reset signal and step 318 resets a pulse count value of the stepping motor 226. As a result, since the pulse count value at the start time is constantly reset, there is no possibility of accumulation of errors and the main scanning operation can be effected accurately.

In the subsequent step 320, it is determined whether variable "n" is equal to the number of main scanning "N" previously set by the frame size. When the decision of step 320 is no, the process proceeds to step 322, in which sub-scan processing is effected. Thereafter, step 324 increments variable "n" and step 308 takes in an image signal of a n-th main scanning operation. Further, when the decision of step 320 is yes, it is determined that scan of one image has been completed, and the process returns to step 300.

Next, when in step 300 the correction time is determined, step 325 sets R at variable "i" to correct the R-LED chips 208R and the process proceeds to step 326. In step 326, a correcting fixed signal of the LED chips of the color corresponding to variable "i" is outputted. Subsequently, in step 328, one LED chip 208 of the color corresponding to variable "i" is specified.

In step 330, the specified LED chip 208 is turned on based on the correcting fixed signal. Step 332 detects the quantity of light of the LED chip 208 by the photo-sensor 228.

In step 334, the detected quantity-of-light signal (actually measured value) is compared with a calculated value of the quantity of light predicted by calculation from the correcting fixed signal. In step 336, based on the compared result, it is determined whether correction is required or not. When it is determined that correction is required from the fact that the difference between the quantity of light when the R-LED chip is turned on and the calculated value of the predicted quantity of light is greater than or equal to a predetermined value, the correction value (correction coefficient) is calculated based on the compared result and the quantity-of-light signal corrected by the correction value (correction coefficient) is outputted to the signal converting section 18 (step 338). Thereafter, the process returns to step 330, in which the same LED chip is turned on by the corrected quantity-of-light signal and a re-measured value and the calculated value of the predicted quantity of light are compared with each other.

Further, when the difference between the re-measured value and the calculated value of the predicted quantity of light is less than the predetermined value after the above correction of the quantity-of-light signal and it is determined in step 336 that no correction is required, in step 339, a correction value is stored at a position corresponding to a specified LED chip on a table in which a correction value is stored correspondingly to each of the LED chips. Meanwhile, the correction value "0" which indicates that no correction is required is stored for an LED chip which has been determined as that which requires no correction prior to correction of the quantity-of-light signal.

After the correction value has been stored in the table, the process proceeds to step 340, in which it is determined whether test for all LED chips 208 of the color corresponding to variable "i" has been completed or not. When the decision of step 340 is no, the process returns to step 328, in which the subsequent LED chip 208 of the color corresponding to variable "i" is specified and the above-described process is repeated.

On the other hand, when it is determined that test for all LED chips 208 of the color corresponding to variable "i" has been completed, in step 342, it is determined whether variable "i" equals R or not. When i=R, step 344 changes variable "i" to G to correct G-LED chips 208G and the process proceeds from step 348 to step 326. In step 326, a correcting fixed signal of the LED chips corresponding to variable "i", namely, a correcting fixed signal of the G-LED chips is outputted.

The quantity of light emitted from the G-LED chip has a predetermined ratio to the quantity of light emitted from the R-LED chip, for example, two fifths the quantity of light emitted from the R-LED chip, and therefore, the correcting fixed signal of the G-LED chips is outputted in such a manner that the level of the correcting fixed signal of the G-LED chips is set at a predetermined ratio (for example, 2/5) to that of the correcting fixed signal of the R-LED chips.

In step 330, the specified LED chip 208 is turned on based on the correcting fixed signal. In step 332, the quantity of light of the LED chip 208 is detected by the photo-sensor 228.

The detected quantity-of-light signal is compared with the calculated value of the quantity of light predicted by calculation from the correcting fixed signal of the R-LED chips in step 334. In step 336, it is determined based on the compared result whether correction is required or not. When it is determined that correction is required from the fact that the ratio between the quantity of light of the G-LED chip turned on and the calculated value of the predicted quantity of light is not set at a predetermined ratio, the correction value is calculated based on the compared result and the quantity-of-light signal corrected by the correction value is outputted to the signal converting section 18 (step 338). The process returns to step 330, in which the same LED chip 208 is turned on by the corrected quantity-of-light signal and a re-measured value and the calculated value of the predicted quantity of light are compared with each other.

When the ratio between the re-measured value and the calculated value of the predicted quantity of light is set at the predetermined value due to the above correction of the quantity-of-light signal and it is determined in step 336 that no correction is required, in step 339, a correction value is stored at a position corresponding to a specified LED chip on a correction table in which a correction value is stored correspondingly to each of the LED chips. Meanwhile, the correction value "0" which indicates that no correction is required is stored for an LED chip which has been determined as that which requires no correction prior to correction of the quantity-of-light signal.

After the correction value has been stored in the table, the process proceeds to step 340, in which it is determined whether test for all LED chips 208 of the color corresponding to variable "i" has been completed or not. When the decision of step 340 is no, the process returns to step 328, in which the subsequent LED chip 208 of the color corresponding to variable "i" is specified, and the above-described process is repeated.

On the other hand, when it is determined that test for all LED chips 208 of the color corresponding to variable "i" has been completed, in step 342, it is determined whether variable "i" equals R or not. When "i" does not equal R, in step 346, variable "i" is changed to B so that B-LED chips 208B are corrected. Thereafter, the process proceeds from step 348 to step 326.

As having been already explained in the correction of the quantity of light emitted from the G-LED chips, a correction table for B-LED chips is calculated such that the ratio of the quantity of light emitted from the B-LED chip to the quantity of light emitted from the R-LED chip becomes a predetermined value (for example, three fifths the quantity of light emitted from the R-LED chip).

When it is determined in step 348 that test for all LED chips has been completed, the process returns to step 300.

When subsequent image recording is effected, the quantity-of-light signal is corrected by using a correction table which is modified such that each correction of the quantity of emitted light and the ratio of the quantity of emitted light is effected.

According to the present embodiment, the photo-sensor 228 is also used for positioning of the light source unit 200, namely, synchronization of the time when the stepping motor 226 drives and correction of the quantity of light of each of the LED chips 208 of the light source portion 204. For this reason, it suffices that one photo-sensor 228 be provided in the vicinity of the photosensitive material 106, thereby resulting in reduction both in installation space and in cost.

Further, the quantity of light is corrected independently for each of a plurality of LED chips 208, and therefore, accurate correction of the quantity of light can be achieved and the quality of a finished image can be improved.

Meanwhile, although in the present embodiment correction is made by using the fixed light-quantity signal, a plurality of different quantity-of-light signals for one LED chip 208 may be used. Also, the degree of variation of known successive quantities of light may be tested in advance.

The variation in the quantity of light is represented by 8 bits, namely, 256 gradations, which is previously set as shown in Table 1 below so that the quantity of light is set for each gradation of each color. In this case, the ratio in the quantity of light between the three colors of R, G, and G is 5:2:3.

TABLE 1

| Gradation | R (0 to 5) | G (0 to 2) | B (0 to 3) |
| --- | --- | --- | --- |
| 0 | 0 | 0 | 0 |
| 1 | 0.0195 | 0.00781 | 0.0117 |
| 2 | 0.039 | 0.0156 | 0.0234 |
| 3 | 0.059 | 0.0234 | 0.0352 |
| 4 | 0.078 | 0.0313 | 0.0469 |
| 5 | 0.098 | 0.0391 | 0.0586 |
| 6 | 0.117 | 0.0469 | 0.0703 |
| 7 | 0.137 | 0.0547 | 0.0820 |
| 8 | 0.156 | 0.0625 | 0.0938 |
| 9 | 0.176 | 0.0703 | 0.105 |
| 10 | 0.195 | 0.0781 | 0.117 |
| 11 | 0.215 | 0.0859 | 0.129 |
| ⋮ | ⋮ | ⋮ | ⋮ |
| 254 | 4.98 | 1.99 | 2.99 |
| 255 | 5.00 | 2.00 | 3.00 |

Figure 8:
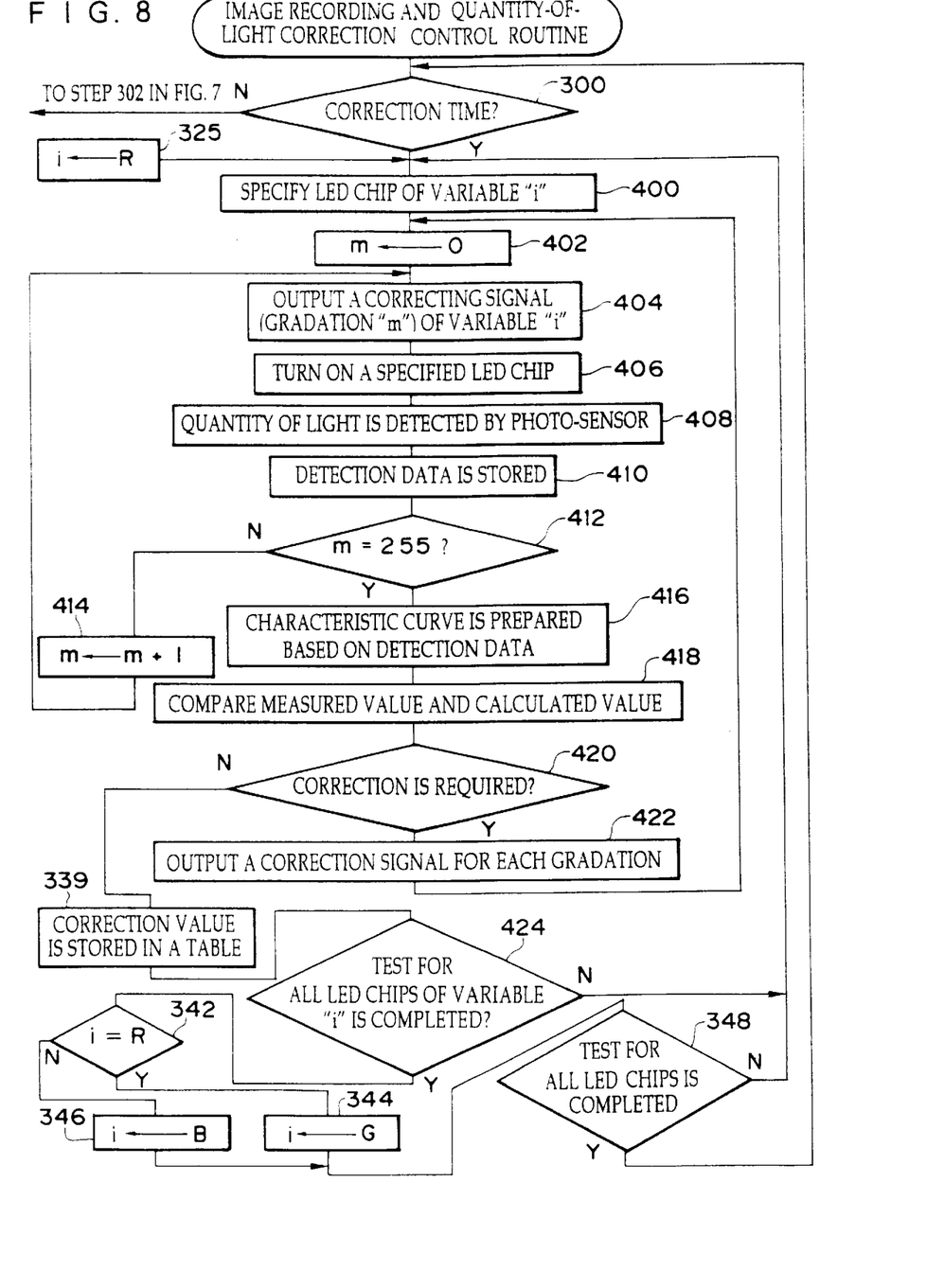
FIG. 8 is a control flow chart which shows a modified example of correction of the quantity of light.

FIG. 8 shows a flow chart for correcting the quantity of light of each LED chip 208 by varying the quantity of light. In FIG. 8, a description of the control (i.e., image recording control) which is effected when the decision of step 300 in the flow chart of FIG. 7 is no will be omitted. Further, note that the same steps as those of the flow chart shown in FIG. 7 will be denoted by the same step numbers, and a description thereof will be omitted.

When in step 300 the correction time is determined, the process proceeds from step 325 to step 400. In step 400, one of the LED chips 208 of the color corresponding to variable "i" is specified. In the subsequent step 402, variable "m" (which indicates gradation) is reset ("0") and the process proceeds to step 404. In step 404, the correcting signal (gradation "m") of the color corresponding to variable "i" is outputted. Subsequently, in step 406, the specified LED chip 208 is turned on, and in step 408, the quantity of light of the LED chip 208 is detected by the photo-sensor 228. The detected quantity of light (actually measured value) is sequentially stored in step 410.

In step 412, it is determined whether variable "m" is equal to 255 or not. When the decision of step 412 is no, step 414 increments variable "m" and the process returns to step 404. By repeating the above process, data of 256 gradations are stored for each LED chip. As a result, a table which indicates the relationship between the correction signal, i.e., the varied drive signal level and the quantity of emitted light is prepared. By preparing the table which indicates the relationship between the varied drive signal level and the quantity of emitted light, the time for the correcting operation can be reduced.

When the decision of step 412 is yes, it is determined that data of 256 gradations has been complete, namely, the table has been prepared. The process proceeds to step 416, in which on the basis of the detection data stored in the data table a characteristic curve of the measured quantity of light of the specified LED chip 208 is prepared.

In step 418, the measured data (the characteristic curve of the measured quantity of light) and the calculated data of the predicted quantity of light obtained by calculation from the correcting signal are compared with each other. In step 420, based on the compared result, it is determined whether correction is required or not. When the decision of step 420 is yes, the correcting signal for each gradation is outputted to the signal converting section 18 on the basis of the compared result (step 422). Thereafter, the process returns to step 402 and the quantities of light at all gradations of the same LED chip 208 are detected.

Further, when it is determined that no correction is required in step 420 as the result of the above-described correction, in step 339, the correction value for generating the correcting signal is stored in the correction table and the process proceeds to step 424, in which it is determined whether test for all LED chips 208 of the color corresponding to variable "i" has been completed or not. When the decision of step 424 is no, the process returns to step 400, in which the subsequent LED chip 208 of the color corresponding to variable "i" is specified and the above-described process is repeated. Further, when the decision of step 424 is yes, it is determined that the correction of the LED chips of the color corresponding to variable "i" has been completed, and in step 342 through step 348, variable "i" is changed to G and B, sequentially, and the correction table is prepared in the same way as described above.

Figure 9:
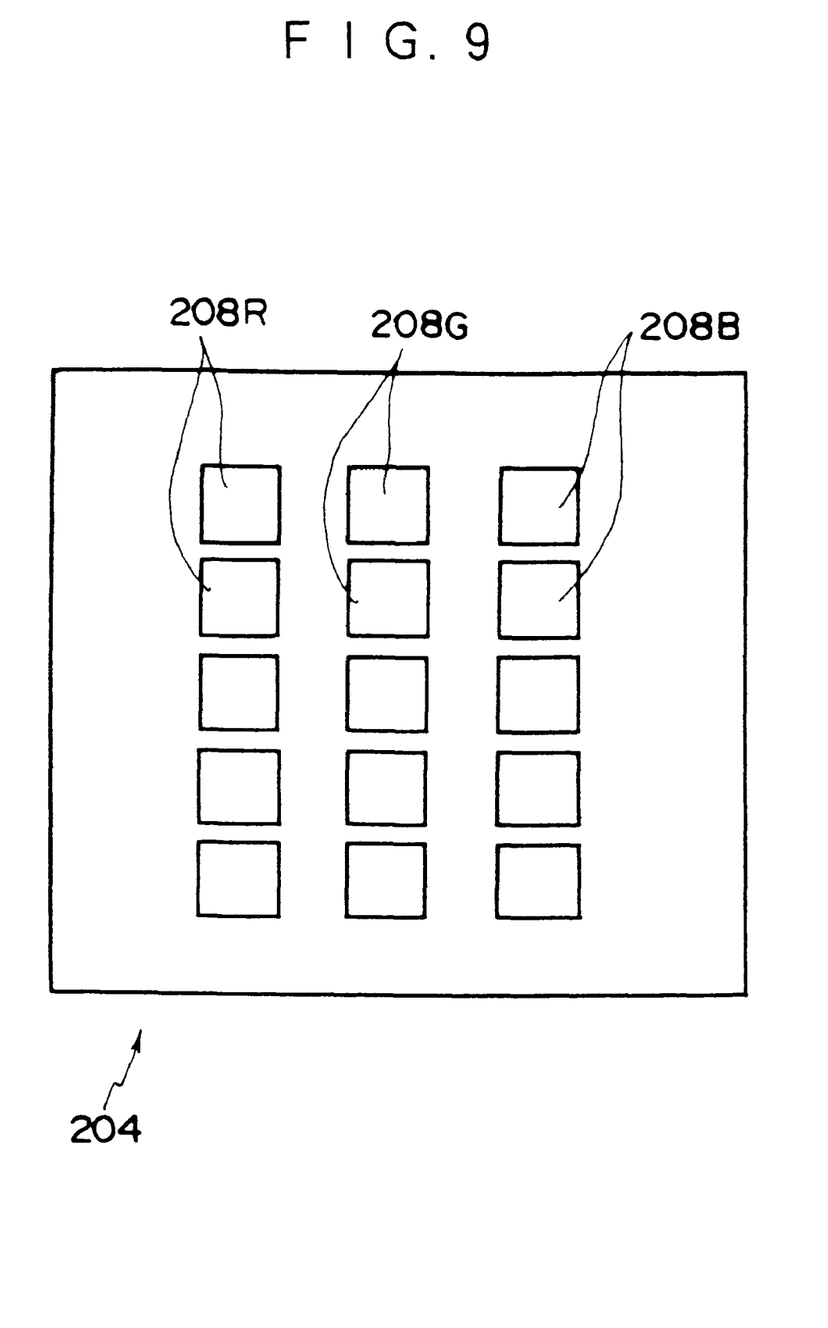
FIG. 9 is a plan view which shows a modified example of the light source portion.

Meanwhile, the above-described embodiment is provided such that the LED chips 208 of the light source portion 204 are arranged in a zigzag manner. However, as shown in FIG. 9, these LED chips may be arranged in vertical and horizontal directions in such a manner that LED chips of each color are arranged in one row. Further, the number of LED chips and the number of rows of the chips may be varied for each of the colors.

What is claimed is:

1. A method for correcting a quantity of light emitted from a light emitting element, in a case in which an image is scanned and recorded on a photosensitive material by controlling, based on digital image data, quantities of light beams emitted from light emitting portions which allows emission of light beams of three colors, light beams of at least one color being emitted from a plurality of light emitting elements, said method comprising the steps of:

correcting a drive signal level of each of the light emitting elements for the same digital image data, causing respective groups of light emitting elements that emit light beams of the same color, of a light emitting portion including a plurality of light emitting elements, to have the same quantities of emitted light within; and     subsequently, correcting the drive signal level of each of the light emitting elements for predetermined digital image data, causing the ratio of the quantity of emitted light between the respective groups of the light emitting elements, which emit light beams of different colors, to be set at a predetermined value.

2. A method for correcting a quantity of emitted light according to claim 1, wherein a drive signal level is detected by changing a drive signal level for each of the light emitting elements to obtain a predetermined quantity of emitted light and an amount of correction is determined based on the detected result.

3. A method for correcting a quantity of emitted light according to claim 2, wherein an amount of correction is determined in such a manner that the light emitting elements are sequentially turned on and the quantity of emitted light of each of the light emitting elements is detected.

4. A method for correcting a quantity of emitted light according to claim 3, comprising the step of utilizing a photosensor and a quantity-of-light correction unit in a feedback loop between the emitted light and the drive signal level.

5. A method for correcting a quantity of emitted light according to claim 1, wherein an amount of correction is determined in such a manner that the light emitting elements are sequentially turned on and the quantity of emitted light of each of the light emitting elements is detected.

6. A method for correcting a quantity of emitted light according to claim 5, comprising the step of utilizing a photosensor and a quantity-of-light correction unit in a feedback loop between the emitted light and the drive signal level.

7. A method for correcting a quantity of emitted light according to claim 1, wherein correction of the drive signal level is effected based on a table which indicates the relationship between the drive signal level varied for each of the light emitting elements and the quantity of emitted light.

8. A method for correcting a quantity of emitted light according to claim 7, wherein the table is prepared in such a manner that the light emitting elements are sequentially turned on and the quantity of light emitted from each of the light emitting elements is detected.

9. A method for correcting a quantity of emitted light according to claim 8, comprising the step of utilizing a photosensor and a quantity-of-light correction unit in a feedback loop between the emitted light and the drive signal level.

10. A method for correcting a quantity of emitted light according to claim 1, comprising the step of utilizing a photosensor and a quantity-of-light correction unit in a feedback loop between the emitted light and the drive signal level.

* * * * *